United States Patent [19]

Appelbaum

[11] Patent Number: 5,042,777

[45] Date of Patent: Aug. 27, 1991

[54] SAFETY LATCH FOR A PORTABLE HYDRAULIC JACK

[76] Inventor: Paul Appelbaum, Box 27006, Denver, Colo. 80227

[21] Appl. No.: 534,535

[22] Filed: Jun. 6, 1990

[51] Int. Cl.$^5$ .......... B60P 1/48; B66F 5/04

[52] U.S. Cl. .......... 254/8 B; 254/DIG. 3

[58] Field of Search .......... 254/8 B, 8 R, 8 C, 2 B, 254/2 R, 2 C, 93 R, 93 H, DIG. 3; 74/481, 519, 523, 524; 60/477, 479

[56] References Cited

U.S. PATENT DOCUMENTS 4,018,421 4/1977 Tallman .......... 254/8 B 4,210,314 7/1980 Carroll et al. .......... 254/8 B 4,241,899 12/1980 Kaneko .......... 254/8 B 4,850,568 7/1989 Hung .......... 254/8 B

*Primary Examiner*—Robert C. Watson

*Attorney, Agent, or Firm*—Charles C. Corbin

[57] ABSTRACT

A safety latch for the hydraulic power release mechanism on a low-slung, floor-mounted portable hydraulic lifting jack of the type operated by an elongated handle that is pumped back and forth in order to raise a lifting arm, and which handle may be twisted about its longitudinal axis to release hydraulic pressure and lower the lifting arm, is disclosed. The safety latch will releasably hold the handle against twisting.

4 Claims, 2 Drawing Sheets

SAFETY LATCH FOR A PORTABLE HYDRAULIC JACK

BACKGROUND OF THE INVENTION

1. Field of the Invention

The present invention relates to portable, wheel-mounted hydraulic lifting jacks of the type used to elevate an automobile off its wheels for automobile repair and inspection. More particularly, this invention pertains to a safety mechanism for such a hydraulic jack.

2. Prior Art

Conventional portable lifting jacks of common usage are wheel-equipped and have a low-slung body which allows it to be conveniently maneuvered under the chassis of a car. An example of such a jack is disclosed in U.S. Pat. No. 4,018,421 in which a long tubular handle is connected at its lower end to a yoke which is operatively connected to a hydraulic ram for actuating an elevating linkage. By pumping the handle back and forth fluid may be pumped to the ram to cause the elevating linkage to raise a load. The lower end of the handles of such jacks are commonly rotatably connected to the yoke for rotation about the axis of the handle, there also being a connection with rotatable shaft means controlling a valve for releasing hydraulic pressure to the ram. This arrangement allows a load to be conveniently lowered by a simple twisting of the handle.

A major drawback with such conventional arrangements in portable lifting jacks is that is allows a raised load to be released and lowered so easily that there is the danger that this could occur inadvertently, with harmful results to person and equipment.

SUMMARY OF THE INVENTION

In view of the above mentioned shortcomings it is a general object of the present invention to provide for a portable lifting jack apparatus which releasably prevents the inadvertent release of a raised load.

A further object is to provide simple, yet effective, releasable means to prevent the twisting of the handle of a lifting jack.

Another object of the present invention is to provide latching apparatus that lends itself to be easily incorporated into existing designs of portable lifting jacks.

Accordingly, these and other objects and advantages are provided by the present invention which is a safety latch for portable lifting jacks. It represents an improvement upon hydraulic lift constructions which include a tubular handle that is rotatably received in a bore in a yoke that pivotally connects to the lift frame. Thus the present invention includes a recession in an upper surface of the yoke, adjacent to the bore, and the lower end portion of the handle has a vertically elongated slot therethrough. The invention further features a latch rod that extends coaxially of the handle with an upper end protruding from the top of the handle, the upper end portion of the rod being slidably mounted to the handle for longitudinal movement and with a lower end of the rod also slidably mounted in the handle and having affixed to it a latching pin that extends outwardly through the slot in the handle. There is biasing means that urges the rod downwardly so that the latching pin may engage the recession in the yoke to secure the handle against rotation, the rod being raisable to withdraw the latching pin from the recession to permit the handle to be rotated to operate to release hydraulic pressure in the hydraulic ram of the lift.

DETAILED DESCRIPTION OF THE INVENTION

Figure 1:
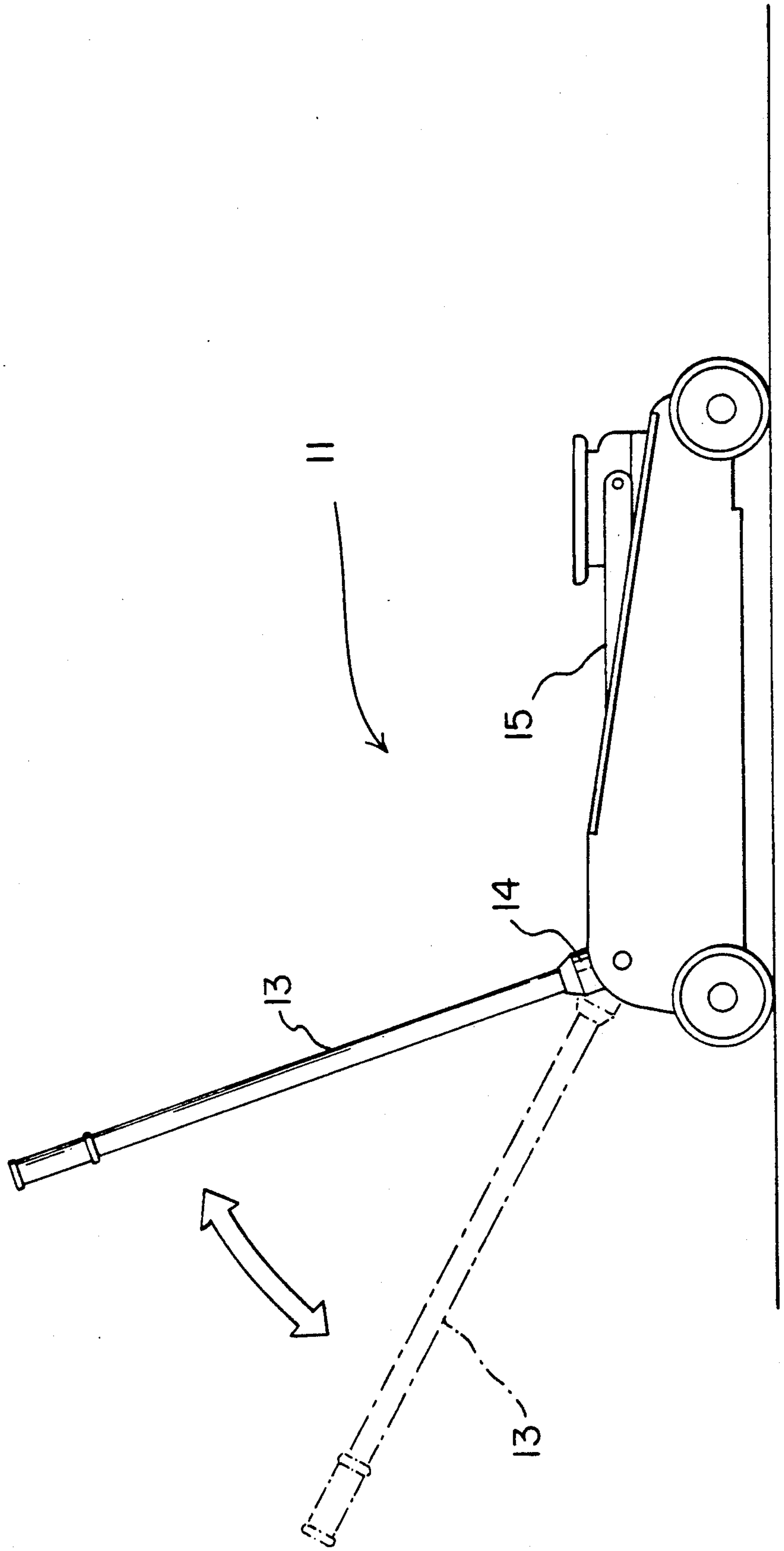
FIG. 1 is a side elevational view showing a low-slung portable lifting jack to which a preferred embodiment of the present invention is applied.

Referring now to the drawings, FIG. 1 shows a low-slung portable hydraulic jack 11 to which the latching mechanism of the present invention is applied and which jack has an elongated tubular handle 13 which is connected to a yoke 14 in a manner to be described, which yoke is operatively linked to a hydraulic pump, hydraulic ram and elevating linkage (all not shown) for raising a lifting arm 15 by manipulating the arm 13 back and forth as suggested in the FIG. 1 illustration.

Figure 2:
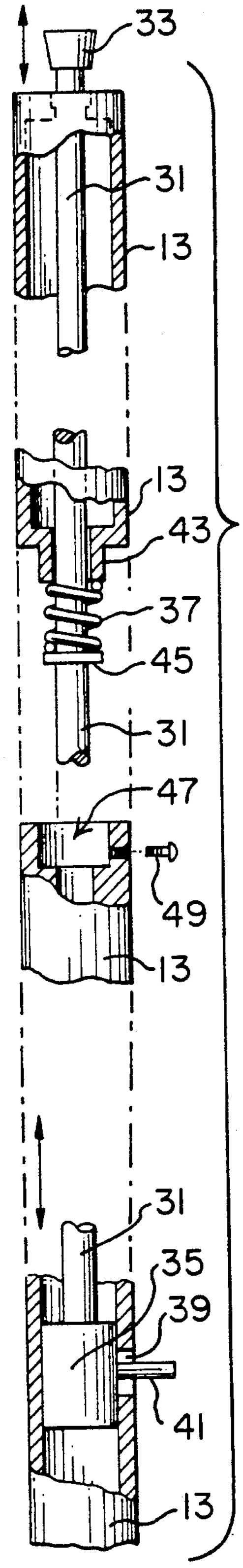
FIG. 2 is a partially sectional, fragmented view with parts broken away for clarity of a jack handle according to the present invention.

FIG. 2 shows that the tubular handle 13 mounts a latching rod 31 which has its upper end portion slidably journaled through the top of the handle with a knob 33 affixed thereto. Using conventional metal working techniques a cylindrical block 35 is secured to the bottom of rod 31 and fits slidably within the handle and a latching pin 41 extends radially from block 35 to which it is affixed and passes through an oblong slot 39 in the wall of the lower end 21 of the handle 13. In this preferred embodiment the handle has an upper section with connects with a lower section, with the lower end 43 of the upper section having a bore therethrough that passes the rod 31, and a coil spring 37 is compressed between a flange 45 and the bottom portion 43 as shown so as to urge rod 31 downwardly.

The lower end 43 of the upper section of the handle is received in the recessed upper end 47 of the lower section of handle 13 and the set screw 49 will secure the handle sections together. The aforedescribed handle assembly will allow pin 41 to be raised and lowered by the raising and lowering of knob 33.

Figure 3:
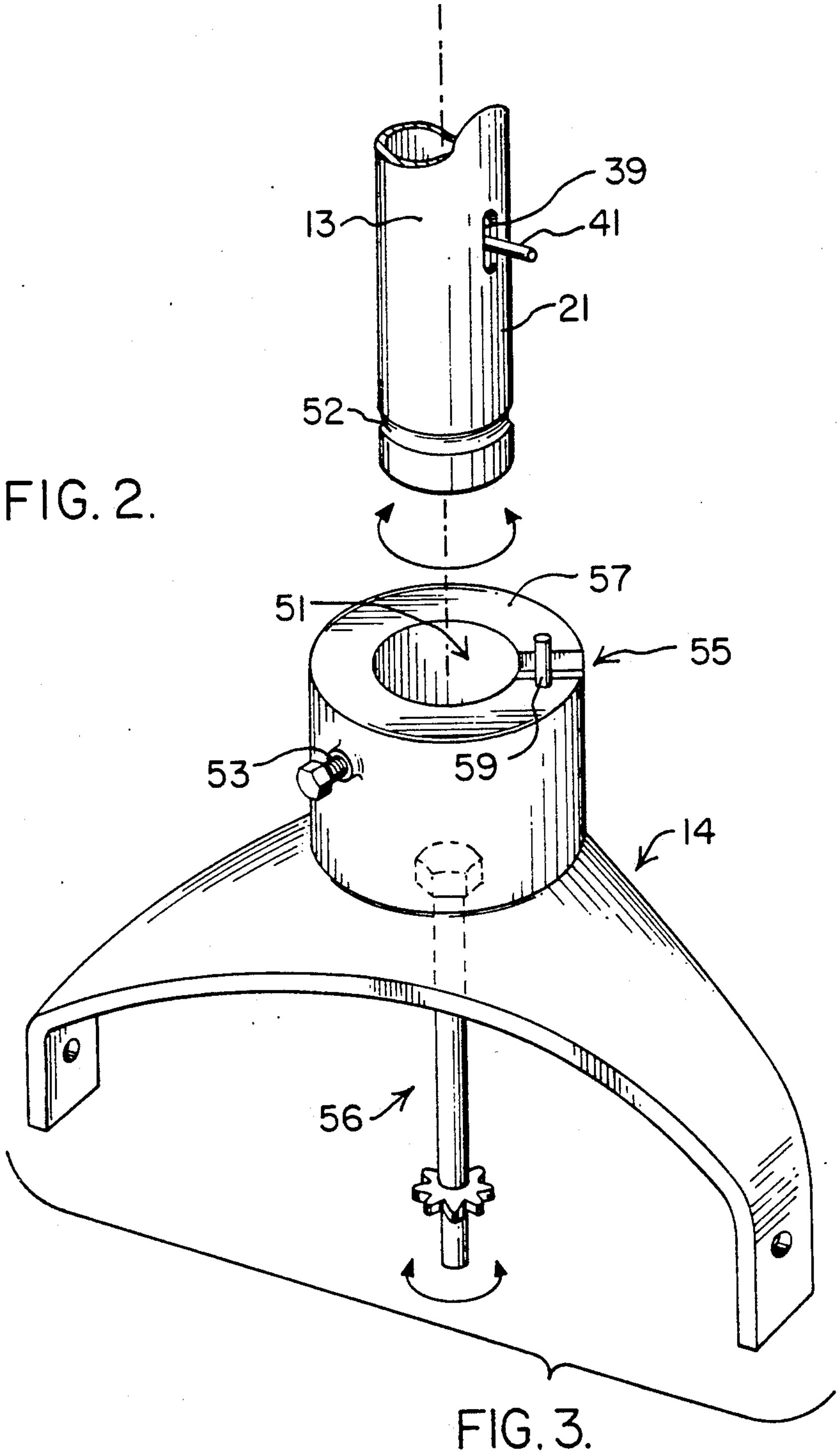
FIG. 3 is a partial, exploded perspective view illustrating structure of interconnecting yoke and handle according to the present invention.

FIG. 3 shows the bore 51 in the yoke 14 which rotatably against removal from bore 51 by virtue of the inner end of threaded pin 53 slidably engaging an annular groove 52 in handle 13. Note that there is a slot 55 lying in the upper surface 57 of yoke 14, which slot 55 is sized to receive pin 41 when the handle 13 is connected to collar 14, and when pin 41 is urged in its lowermost position in slot 39. Pin 41, when engaged in slot 55, will prevent handle 13 from being rotated about its axis. When the knob 33 is raised the latch pin 41 will clear the slot 55 and then the handle 13 is free to be rotated with pin 41 lying above the yoke surface 57. No more than one revolution of the handle 13, and connector 56 is required in order to rotatably release the valve (not shown) that controls hydraulic lifting pressure in the jack 11. Note that a vertical pin 59 is affixed to the yoke 14 and will be abutted by the latch pin 41 to prevent more than one revolution of handle 13.

In using the latch mechanism of the prevent invention the mechanism will normally be in a latched position in which pin 41 resides in groove 55 and is maintained therein by downward urging of spring 37, so as to prevent the twisting of handle 13 and thus the rotation of the connecting drive member 56, thereby insuring against any inadvertent release of hydraulic fluid pressure in the lift 11. In this configuration handle 19 may be operated in the conventional manner to allow lift 11 to raise a load. When it is desired to lower a load, more must be done than merely twisting handle 19. Rather, the knob 33 must be first raised, to release pin 41. The handle 19 is then free to be twisted so as to turn connecting drive member 56 which will release hydraulic pressure.

A preferred embodiment of the invention has been described and it should be appreciated by those with ordinary skill in the art, that within the scope of this invention, various changes may be made. Thus it is aimed to cover all such changes as fall within the true spirit and scope of the invention in the claims which follow.

What is claimed is:

1. Safety latch mechanism for a low-slung portable hydraulic jack, which jack is characterized by including a base supported on wheels and elevating linkage, a hydraulic ram operating with the linkage and an elongated tubular handle which is operatively connected at its lower end to a yoke that is pivotally mounted to the base, for pressurizing said hydraulic ram and with rotatable means interconnecting the lower end of said handle with means for releasing hydraulic pressure in said ram, said yoke having a bore for slidably receiving the lower end of said handle, the lower end of said handle having an annular groove and means on said yoke engaging said groove to allow rotation of said handle about its longitudinal axis while holding against vertical movement, said safety mechanism including:

a) latch rod, mounted coaxially with said tubular handle with an upper portion of said rod extending beyond the top of said handle and adapted for grasping, and supported for vertical motion by said handle and a lower portion of said rod slidably supported within said handle for vertical motion;

b) longitudinally extending slot in a lower end portion of said tubular handle;

c) latch pin fixed to a lower end portion of said rod and projecting through and beyond said handle slot;

d) biasing means mounted within said handle for urging said rod downwardly so as to bring said latch pin into abutting engagement with the lower edge of said slot; and e) wherein an upper face of said yoke has a recession therein which is adapted to receive said latch pin and thereby hold said rod against rotation, and said handle being rotatable when said rod is raised to raise said latch pin upwardly out of engagement with said recession.

2. Apparatus as defined in claim 1 wherein the top of said rod is equipped with a knob.

3. Apparatus as defined in claim 1 including means projecting upwardly from the upper surface of said yoke for being engaged by said latching pin to prevent more than one revolution of said handle.

4. Apparatus as defined in claim 1 wherein the lower end of said rod is a cylindrical block, and said latch pin is perpendicularly affixed to said block.

* * * * *